United States Patent [19]

Hatta

[11] Patent Number: 4,711,040

[45] Date of Patent: Dec. 8, 1987

[54] APPARATUS FOR CONTINUOUSLY THERMALLY TREATING ELONGATE TEXTILE PRODUCTS

[75] Inventor: Keizo Hatta, Uozu, Japan

[73] Assignee: Yoshida Kogyo K. K., Tokyo, Japan

[21] Appl. No.: 858,001

[22] Filed: May 1, 1986

[30] Foreign Application Priority Data

May 15, 1985 [JP] Japan .............................. 60-71888[U]
May 17, 1985 [JP] Japan .............................. 60-73312[U]
May 24, 1985 [JP] Japan .............................. 60-77369[U]

[51] Int. Cl.⁴ .......................................... F26B 13/08
[52] U.S. Cl. .......................................... 34/73; 34/79; 34/157; 34/159; 68/18 R
[58] Field of Search ................... 34/72, 73, 75, 79, 86, 34/157, 159, 242; 68/18 C, 18 R

[56] References Cited

U.S. PATENT DOCUMENTS 3,783,649 1/1974 Yamamoto et al. ................. 34/242
4,150,494 4/1979 Rothchild ............................. 34/86

FOREIGN PATENT DOCUMENTS 47-21276 6/1972 Japan .

Primary Examiner—Albert J. Makay
Assistant Examiner—David W. Westphal

Attorney, Agent, or Firm—Hill, Van Santen, Steadman & Simpson

[57] ABSTRACT

An apparatus for continuously thermally treating an elongate textile product such as a slide fastener stringer tape having oil includes a housing having a preheated chamber for preheating the textile product and a main heating chamber for heating the elongate textile product after it has been preheated to give off an oily smoke. Part of the oily heated air in the main heating chamber is discharged out of the housing through a heat exchanger which supplies heated air of lower temperature to the preheating chamber. To remove a tar deposit from the heat exchanger, the supply of cold air to the heat exchanger is cut off and the heat exchanger is heated by the heated air discharged from the main heating chamber. The tar deposit is then melted and collected by a tar collector. The main heating chamber has inlet and outlet slots for the elongate textile product, the inlet slot opening into the preheating chamber and the outlet slot opening into an outlet chamber communicating with the preheating chamber. Since the preheating and outlet chambers are pressurized with the heated air of lower temperature, the heated air is prevented from leaking from the main heating chamber through the inlet and outlet slots and external cold air is prevented from entering the main heating chamber through the inlet and outlet slots.

10 Claims, 3 Drawing Figures

APPARATUS FOR CONTINUOUSLY THERMALLY TREATING ELONGATE TEXTILE PRODUCTS

BACKGROUND OF THE INVENTION

1. Field of the Invention:

The present invention relates to an apparatus for continuously thermally treating elongate textile products such as yarns, tapes, ribbons, or the like.

2. Description of the Prior Art:

Textile products generally contain oil since their yarns are oiled when they are twisted, woven, or knitted. At the time such an oiled textile product is thermally treated, or heated, in the housing of a heat treatment apparatus, the oil in the textile product becomes an oily smoke that is deposited as tar on the textile product and the inner wall surfaces of the housing, thereby contaminating them. If such oily smoke leaks out of the housing, the working environment for the operator or operators around the housing becomes poor. Various attempts have heretofore been made to prevent oily smoke from being enriched in the housing. One proposed process has been to discharge part of hot air circulating in the housing and introduce fresh air into the housing. Before the hot air is discharged from the housing, it is guided to flow through a heat exchanger to retrieve waste heat therefrom. When oily smoke in the hot air is brought into contact with fresh air in the heat exchanger, it is cooled and deposited as tar in the heat exchanger. The deposited tar should be removed periodically by shutting off and disassembling the heat treatment apparatus to clean up the heat exchanger for effective operation. Such periodic shutdowns however result in a reduction in the production rate.

The housing of the heat treatment apparatus is required to be thermally isolated from the external environment. To meet this requirement, the inlet or outlet of the housing is connected to a low pressure chamber for preventing cold external air from entering the housing through the inlet or outlet. One such an arrangement is known from Japanese Patent Publication No. 47(1972)-21276 as illustrated in FIG. 3 of the accompanying drawings. The low-pressure chamber, denoted at A, is coupled to the inlet of the housing, and is supplied with heated air under pressure which is used for thermally treating the elongate textile article. The pressure in the low-pressure chamber is equalized to or higher than the atmospheric pressure to prevent cold external air from being drawn into the housing through the inlet. The above conventional housing design is however disadvantageous in that heat consumption by the overall apparatus is increased and hence the cost is high since part of the heated air in the housing is utilized to avoid entry of air for thermal isolation of the housing. Where the textile product being heat-treated is an oiled article, generated oily smoke tends to flow together with the heated air out of the housing through the inlet and outlet thereof, resulting in environmental contamination.

SUMMARY OF THE INVENTION

It is an object of the present invention to provide an apparatus for continuously thermally treating elongate textile products, the apparatus having means for removing a deposit of tar from a heat exchanger without an apparatus shutdown.

Another object of the present invention is to provide an apparatus for continuously thermally treating elongate textile products, which is capable of keeping a heat treatment housing uniform and stable in temperature distribution therein while effectively utilizing thermal energy for lower heat consumption.

According to the present invention, an apparatus for continuously thermally treating an elongate textile product includes a housing having a preheating chamber for preheating the elongate textile product and a main heating chamber for heating the elongate textile product after it has been preheated, and a heat exchanger disposed in the preheating chamber. An outlet tube is connected to the heat exchanger for discharging heated air from the main heating chamber through the heat exchanger, the outlet tube having a first regulating valve. An intake tube is connected to the heat exchanger for introducing external air through the heat exchanger into the preheating chamber, the intake tube having a second regulating valve. When removing a deposit of tar from the heat exchanger, the second regulating valve is closed to cut off the supply of the external air to the heat exchanger, and the first regulating valve is substantially opened to allow the heated air to flow from the main heating chamber through the heat exchanger for thereby heating the heat exchanger. The deposited tar in the heat exchanger is then melted and flows therefrom into a tar collector connected to the heat exchanger. Therefore, the heat exchanger can be cleaned easily without shutting off and disassembling the apparatus, so that the apparatus can thermally treat the elongate textile product highly efficiently.

The housing includes a partition by which the preheating and main heating chambers are divided, the partition having an inlet slot covered by the preheating chamber for introducing the elongate textile product into the main heating chamber. The housing also includes a side wall having an outlet slot defined therein for discharging the elongate textile product out of the main heating chamber. An outlet chamber is mounted on the side wall in covering relation to the outlet slot. Heated air from the heat exchanger is supplied to the preheating chamber and the outlet chamber. Since the heated air is forced into the preheating chamber and the outlet chamber to develop a certain air pressure therein, heated air in the main heating chamber is prevented from leaking out through the inlet and outlet ports and external cold air is prevented from entering the main heating chamber through the inlet and outlet ports. As a consequence, the temperature within the main heating chamber is kept uniform and stable for thermally treating the elongate textile product uniformly and stably. Inasmuch as the air supplied to the preheating chamber and the outlet chamber is heated by the heat that is retrieved by the heat exchanger from the heated air discharged from the main heating chamber, the thermal energy consumed by the apparatus is effectively utilized. The working environment for the operator or operators around the housing is maintained at a desired level since the heated air, which contains oily smoke, is prevented from leaking from the main heating chamber. Heat loss from the outlet slot of the main heating chamber may also be minimized by a suction chamber disposed in covering relation to the outlet slot for drawing the heated air from the main heating chamber and the outlet chamber. The heated air drawn by the suction chamber is heated and circulated again in the main heating chamber.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
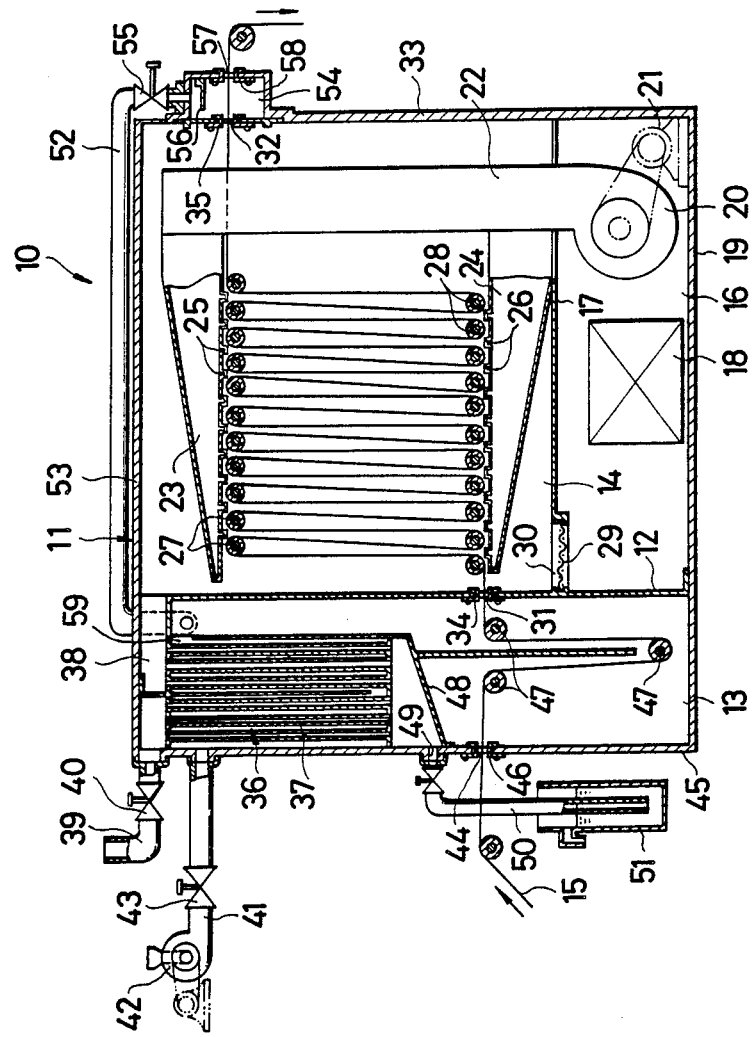
FIG. 1 is a vertical cross-sectional view of an apparatus for continuously thermally treating elongate textile products according to an embodiment of the present invention.

Identical parts are denoted by identical reference characters throughout the views.

FIG. 1 illustrates an apparatus for continuously thermally treating elongate textile products according to the present invention.

The apparatus, generally designated by the reference numeral 10 in FIG. 1, includes a heat treatment housing 11 with its surrounding walls made of a heat insulation material. The housing 11 is generally divided by a vertical partition 12 into a preheating chamber 13 and a main heating chamber 14 adjacent thereto. An elongate textile product 15 such as a slide fastener stringer tape (hereinafter referred to as a "fastener tape") is guided to travel along a tortuous path through the preheating chamber 13 and then through the main heating chamber 14 while being thermally treated by circulating hot air applied thereto.

The main heating chamber 14 includes a blower chamber 16 defined below a horizontal partition 17 and accommodating a heater 18 placed on a lower wall 19 of the housing 11. An air blower or fan 20 driven by a motor 21 is also mounted on the lower wall 19 for circulating air heated by the heater 18 into the main heating chamber 14. The air blower 20 is connected by a vertical duct 22 extending upwardly through the horizontal partition 17 to a pair of upper and lower hot-air radiators 23, 24 which are disposed in the main heating chamber 14 above the horizontal partition 17 and spaced vertically from each other. The upper and lower hot-air radiators 23, 24 have nozzles 25, 26, respectively, directed downwardly and upwardly, respectively. Between the upper and lower hot-air radiators 23, 24, there are an upper array of rollers 27 and a lower array of rollers 28 for guiding the fastener tape 15 to travel along a zig-zag or tortuous path between the upper and lower hot-air radiators 23, 24.

While the fastener tape 15 is moving along the tortuous path around the rollers 27, 28, air heated by the heater 18 is forced by the air blower 20 to flow through the duct 22 into the upper and lower hot-air radiators 23, 24, from which the hot air is ejected through the nozzles 25, 26 against the fastener tape 15 to thermally treat same. The hot air is then passed through a filter 29 disposed in a hole 30 defined in the end of the horizontal partition 17 which is joined to the vertical partition 12. The hot air that has entered the blower chamber 16 is drawn by the air blower 20 through the heater 18 to flow again toward the upper and lower hot-air radiators 23, 24. Therefore, the hot air circulates in the main heating chamber 14 during operation of the apparatus 10.

The vertical wall 12 has an inlet slot 31 defined therein closely to the distal end of the lower hot-air radiator 24. The housing 11 includes a righthand (as shown) side wall 33 having an outlet slot 32 defined near an upper end thereof. The fastener tape 15 is introduced into the main heating chamber 14 through the inlet slot 31 and is discharged from the main heating chamber 14 through the outlet slot 32. The inlet and outlet slots 31, 32 are adjustable in their opening by respective slot adjustors 34, 35 for minimizing the amount of hot air flowing out of the main heating chamber 14 and the amount of cold air flowing into the main heating chamber 14 through these inlet and outlet slots 31, 32.

Before the fastener tape 15 is introduced into the main heating chamber 14, it is heated in the preheating chamber 13 by air that is heated to a relatively low temperature by a heat exchanger 36 accommodated in the preheating chamber 13. With the fastener tape 15 being thus preheated in the preheating chamber 13, the time required for thermally treating the fastener tape 15 in the main heating chamber 14 is reduced. The preheating chamber 13 also serves to prevent cold external air from entering the main heating chamber 14 through the inlet slot 31.

The heat exchanger 36, which is positioned in an upper portion of the preheating chamber 13, is of a known construction including an elongate bent pipe 37 having one end communicating with the main heating chamber 14 through a duct 38 and the opposite end communicating with an outlet tube 39 having a regulating valve 40. The space around the pipe 37 in the heat exchanger 36 is held in communication with an intake tube 41 coupled to an air blower 42 and having a regulating valve 43, and also with the preheating chamber 13 through a discharge port 59 of the heat exchanger 36 opening into the preheating chamber 13. When heated air delivered from the main heating chamber 14 via the duct 38 (for the reason given later) flows through the pipe 37 into the outlet tube 39, the pipe 37 is heated and air introduced via the intake tube 41 into the heat exchanger 36 is heated by the heat of the pipe 37 to a temperature that is lower than the temperature of the hot air discharged from the main heating chamber 14. The heated air is thereafter forced into the preheating chamber 13 to maintain a certain positive pressure therein for preventing hot air from flowing from the main heating chamber 14 into the preheating chamber 13 through the inlet slot 31 and also to prevent external cold air from entering the preheating chamber 13 through another inlet slot 44 defined in a lefthand (as shown) side wall 45 of the housing 11. The inlet slot 44 has a slot adjustor 46. The fastener tape 15 unreeled from a tape supply reel (not shown) is delivered through the inlet slot 44 into the preheating chamber 13 in which the fastener tape 15 is guided by rollers 47 to travel along a reversing path before being supplied into the main heating chamber 14 through the inlet slot 31.

Below the heat exchanger 36, there is disposed a slanted plate 48 having a lower end connected to the side wall 45 beneath a discharge hole 49 defined therein and connected by a drain tube 50 to a tar collector 51.

The preheating chamber 13 is connected by a connector tube 52 extending over an upper wall 53 of the housing 11 to an outlet chamber 54 attached to the side wall 33 of the housing 11, the connector tube 52 having a regulating valve 55. The outlet chamber 54 has a baffle plate 56 lying horizontally below the outlet end of the connector tube 52, and an outlet slot 57 through which the fastener tape 15 delivered from the outlet slot 32 of the main heating chamber 14 is discharged. The opening of the outlet slot 57 can be adjusted by a slot adjustor 58.

The hot air in the main heating chamber 14 contains oily smoke produced by heating the fastener tape 15 that was previously oiled. Part of the hot air is discharged from the main heating chamber 14 through the duct 38 into the heat exchanger 36 to reduce the density of the oily smoke in the main heating chamber 14. At the same time, an amount of clean air commensurate with the discharged amount of hot air is introduced through the intake tube 41, the heat exchanger 36, the preheating chamber 13, the connector tube 52, and the outlet chamber 54 into the main heating chamber 14. The hot air as it passes through the heat exchanger 36 is cooled since it heats the clean air in the heat exchanger 36. Therefore, the oily smoke in the hot air is also cooled and deposited as tar on the outer wall surfaces of the pipe 37 and inner wall surfaces of the heat exchanger 36. To remove such a tar deposit, the regulating valve 43 in the intake tube 41 is closed to cut off the delivery of cold clean air into the heat exchanger 36 and the regulating valve 40 in the outlet tube 39 is opened or partly closed to allow the hot air to flow through the heat exchanger 36. Therefore, the temperature within the heat exchanger 36 is increased by the heat of the hot air and the heat of the main heating chamber 14 near the heat exchanger 36 until the deposited tar is melted. The melted tar is then allowed to fall onto the slanted plate 48 from which it flows through the drain tube 50 into the tar collector 51. Consequently, the deposited tar can be removed while the fastener tape 15 is being thermally treated in the main heating chamber 14, without shutting off and disassembling the apparatus 10.

The outlet chamber 54 is defined by a box mounted on the side wall 33 in covering relation to the outlet slot 32. The baffle plate 56 extends horizontally over the width of the outlet slot 57 for distributing heated air from the connector tube 52 uniformly into the outlet chamber 54. The heated air supplied from the connector tube 52 into the outlet chamber 54 keeps a certain positive air pressure therein to prevent a hot-air leakage from the main heating chamber 14 into the outlet chamber 54 and also to prevent external air from flowing into the outlet chamber 54 through the outlet slot 57. Even if a vacuum were created in the main heating chamber 14 by discharging part of the hot air therefrom during removal of the deposited tar from the heat exchanger 36, no cold external air is directly introduced into the main heating chamber 14 since the preheating chamber 13 and the outlet chamber 54 are filled with pressurized heated air. As a result, the temperature within the main heating chamber 14 is kept uniform and stable for heat-treating the fastener tape 15 uniformly and stably. The leakage of oily smoke out of the main heating chamber 14 is prevented substantially completely.

The regulating valves 43, 55 are operated to supply a controlled amount of heated air into the preheating chamber 13 and the outlet chamber 54. The regulating valve 40 is effective in regulating the flow of heated air discharged from the main heating chamber 14 so that generated oily smoke can be minimized in the main heating chamber 14.

Figure 2:
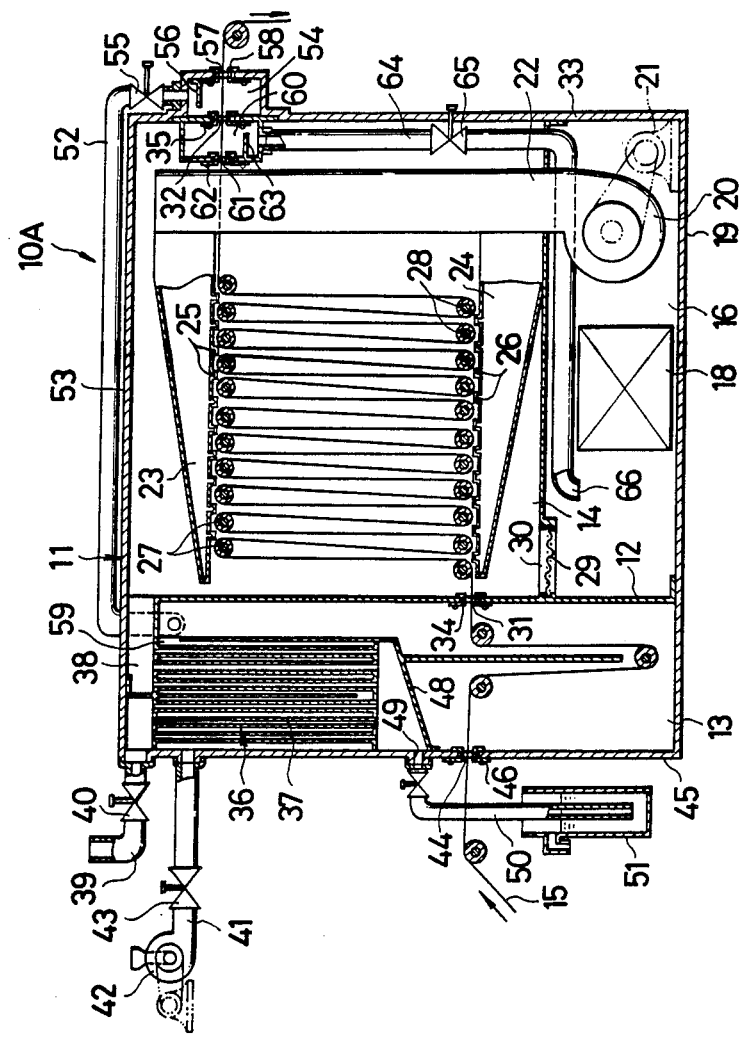
FIG. 2 is a vertical cross-sectional view of another embodiment of the present invention.
Figure 3:
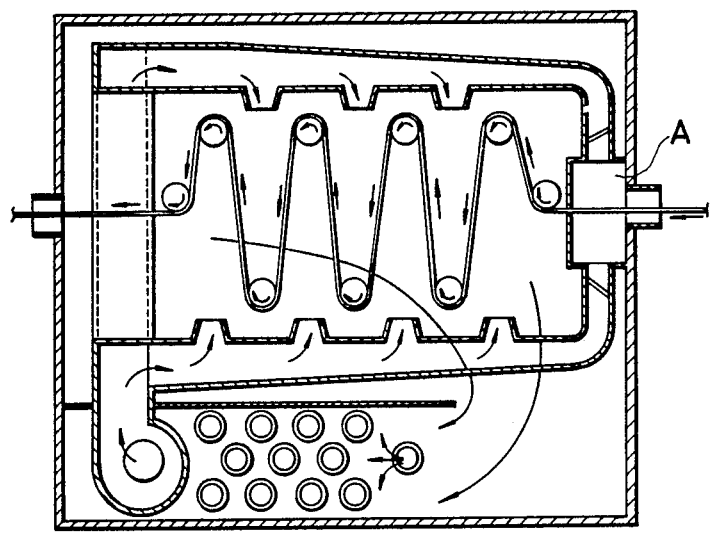
FIG. 3 is a vertical cross-sectional view of a conventional apparatus for continuously thermally treating elongate textile products.

FIG. 2 shows an apparatus for continuously thermally treating elongate textile products such as fastener tapes according to another embodiment of the present invention. The apparatus, denoted at 10A, is different from the apparatus 10 of FIG. 1 in that a suction chamber 60 is disposed within the main heating chamber 14 and attached to the side wall 33 in covering relation to the outlet slot 32 in the side wall 33. The suction chamber 60 has an outlet slot 61 for passage therethrough of the fastener tape 15 from the main heating chamber 14, the outlet slot 61 having a slot adjustor 62. The suction chamber 60 also has a baffle plate 63 lying horizontally below the outlet slot 61, the baffle plate 63 being coextensive with the width of the suction chamber 60. The suction chamber 60 communicates with the blower chamber 16 through a suction conduit 64 having a regulating valve 65. The baffle plate 63 is positioned over the upper open end of the suction conduit 64 which is connected to the suction chamber 60. The suction conduit 64 has a lower open end 66 positioned in front of the heater 18.

The fastener tape 15 which has been thermally treated in the main heating chamber 14 is continuously discharged successively through the outlet slots 61, 32, 57 out of the apparatus 10A. A partial vacuum developed by the air blower 20 in the blower chamber 16 acts through the suction conduit 64 in the suction chamber 60. Therefore, heated air introduced into the suction chamber 60 from the main heating chamber 14 and the outlet chamber 54 is forced to flow through the suction conduit 64 into the blower chamber 16, from which the air is passed through the heater 18 and heated thereby. The heated air is then forced by the air blower 20 to circulate again in the main heating chamber 14. The regulating valve 65 is operated to regulate the vacuum acting in the suction chamber 60. The baffle plate 63 serves to cause the suction from the suction conduit 64 to act uniformly in the suction chamber 60 fully across the outlet slots 62, 32.

The suction chamber 60, combined with the preheating chamber 13 and the outlet chamber 54, is therefore highly effective to prevent the hot air from flowing out of the main heating chamber 14. Loss of thermal energy from the main heating chamber 14 is avoided more effectively, while at the same time the temperature in the main heating chamber 14 remains more uniform and stabler. As a result, the fastener tape 15 can be thermally treated more uniformly and stably. Additionally, the suction chamber 60 can completely prevent the leakage of oily smoke from the main heating chamber 14, thus avoiding contamination of the working environment for the operator or operators around the apparatus 10A.

Although various minor modifications may be suggested by those versed in the art, it should be understood that I wish to embody within the scope of the patent warranted hereon, all such embodiments as reasonably and properly come within the scope of my contribution to the art.

What is claimed is:

1. An apparatus for continuously thermally treating an elongate textile product having oil, comprising:
   (a) a housing having a preheating chamber for preheating the elongate textile product and a main heating chamber for heating the elongate textile product to give off an oily smoke after it has been preheated;

(b) a heat exchanger disposed in said preheating chamber for condensing and collecting solidified tar thereon from the oily smoke;

(c) an outlet tube connected to said heat exchanger for discharging heated oily air from said main heating chamber through said heat exchanger, said outlet tube having a first regulating valve;

(d) an intake tube connected to said heat exchanger for introducing external air through said heat exchanger into said preheating chamber, said intake tube having a second regulating valve; and (e) a tar collector connected to said heat exchanger for periodically melting and collecting melted tar which flows off said heat exchanger when it is melted by heat produced at an interval of time when said first regulating valve is substantially open and said second regulating valve is closed.

2. An apparatus according to claim 1, wherein said housing includes a partition by which said preheating and main heating chambers are divided, said partition having an inlet slot covered by said preheating chamber for introducing said elongate textile product into said main heating chamber, said housing including a side wall having an outlet slot defined therein for discharging said elongate textile product out of said main heating chamber, an outlet chamber mounted on said side wall in covering relation to said outlet slot, and means for supplying heated air from said heat exchanger to said preheating chamber and said outlet chamber.

3. An apparatus according to claim 2, wherein said means comprises a discharge port of said heat exchanger which opens into the preheating chamber and a connector tube communicating between said preheating chamber and said outlet chamber.

4. An apparatus according to claim 3, wherein said outlet chamber has a baffle plate lying below an end of said connector tube opening into said outlet chamber.

5. An apparatus according to claim 2, wherein said outlet chamber has an outlet slot for discharging said elongate textile product delivered from said outlet slot of said side wall.

6. An apparatus according to claim 5, wherein said inlet slot and said outlet slots have slot adjustors respectively, for adjusting the opening of the inlet and outlet slots.

7. An apparatus according to claim 2, wherein said main heating chamber has a blower chamber, further including blower means disposed in said blower chamber for producing a partial vacuum in said blower chamber to circulate heated air in said main heating chamber, a suction chamber disposed within said main heating chamber and mounted on said side wall in covering relation to said outlet slot, said suction chamber having an outlet slot for discharging said elongate textile product therethrough into said outlet slot of said side wall, and a conduit tube extending from said suction chamber into said blower chamber and having a regulating valve.

8. An apparatus according to claim 7, wherein said suction chamber has a baffle plate lying over an end of said conduit tube opening into said suction chamber.

9. An apparatus according to claim 7, wherein said conduit tube has an open end positioned in said blower chamber, further including a heater disposed in said blower chamber between said open end of said conduit tube and said blower means.

10. An apparatus according to claim 1, wherein said preheating chamber includes a slanted plate disposed below said heat exchanger for guiding the melted tar into said tar collector.

* * * * *